United States Patent [19]
Sillen et al.

[11] Patent Number: 5,210,668
[45] Date of Patent: May 11, 1993

[54] MAGNETIC HEAD HAVING SOFT-MAGNETIC MATERIAL CLADDED CORE LIMB FACES

[75] Inventors: Cornelis W. M. P. Sillen; Franciscus W. A. Dirne; Jacobus J. M. Ruigrok, all of Eindhoven, Netherlands; Wolfgang Binder-Krieglstein, Vienna; Ulrich Traxlmayr, Laxenburg, both of Austria

[73] Assignee: U.S. Philips Corporation, New York, N.Y.

[21] Appl. No.: 688,016

[22] Filed: Apr. 19, 1991

[30] Foreign Application Priority Data

Feb. 4, 1991 [NL] Netherlands ............ 9100192

[51] Int. Cl.⁵ .............................................. G11B 5/235
[52] U.S. Cl. ...................................................... 360/120
[58] Field of Search ................................. 360/120, 126

[56] References Cited

U.S. PATENT DOCUMENTS

| | | | |
|---|---|---|---|
| 4,780,779 | 10/1988 | Pisharody et al. | 360/120 |
| 4,887,177 | 12/1989 | Sillen | 360/120 |
| 5,001,589 | 3/1991 | Rask et al. | 360/126 |
| 5,001,590 | 3/1991 | Saito et al. | 360/126 |

FOREIGN PATENT DOCUMENTS 0273496 7/1988 European Pat. Off.

*Primary Examiner*—Robert S. Tupper
*Attorney, Agent, or Firm*—Norman N. Spain

[57] ABSTRACT

Magnetic head comprising a magnetic core having two core limbs (1,3) formed from a ferrite, which core limbs constitute two core faces located opposite each other, at least one of said core faces having a cladding of a soft-magnetic material having a higher saturation magnetisation than the ferrite, and a non-magnetic transducing gap (11) present between the core faces and having at least one layer of a first metallic material (21) and bonded layers (23) of a second metallic material. The cladding comprises a first cladding layer (15) of an alloy based on Ni-Fe on which a second cladding layer (17) of an amorphous alloy based on Co-Ti and/or Zr and/or Hf-Nb and/or Ta is provided, while the first metallic material, chosen from the group of Mo, Ti, Cr and NiCr, is directly provided on the amorphous alloy of the cladding. (FIG. 2).

7 Claims, 1 Drawing Sheet

MAGNETIC HEAD HAVING SOFT-MAGNETIC MATERIAL CLADDED CORE LIMB FACES

BACKGROUND OF THE INVENTION

The invention relates to a magnetic head for recording and/or reproducing magnetic information in a track of a magnetic information carrier, comprising a magnetic core having two core limbs formed from a ferrite. The core limbs constitute two core faces located opposite each other, at least one of said core faces having a cladding of a soft-magnetic material having a higher saturation magnetization than the ferrite. The magnetic head also comprises a tape contact face along which the information carrier is movable, a non-magnetic transducing gap present between the core faces and terminating in the tape contact face, which gap has at least one layer of a first metallic material and bonded layers of a second metallic material, the first metallic material being chosen from the group of Mo, Ti, Cr and NiCr, and an electric coil passing through a winding aperture and surrounding a part of the magnetic core.

Such a magnetic head is known from European Patent Application EP 0,273,496 (PHN 11.962; herein incorporated by reference).

It is generally known to use ferrites such as monocrystalline Mn-Zn ferrite as a magnetic core material for magnetic heads. Among the advantages of such ferrites are a high resistance to wear, a relatively high specific resistance and satisfactory magnetic properties as regards coercive force and permeability.

Magnetic fields which are generated by a magnetic head at the area of the transducing gap for writing information on a magnetic medium are directly dependent on the saturation magnetization of the material of the magnetic head core. The above-mentioned ferrites generally have a saturation magnetization which is sufficiently high to write information on conventional tapes such as $CrO_2$ tapes having a coercive force $H_c$ of approximately 700 Oersted. For recording information on magnetic tapes having a higher coercive force, such as ME magnetic tapes based on Co-Ni, conventional magnetic heads which exclusively have a ferrite at both sides of the transducing gap are less suitable. The magnetic fields which are generated by such magnetic heads to write information on a magnetic medium are in fact limited by the relatively low saturation magnetisation of the ferrite. The strength of the writing field is therefore insufficiently high to ensure optimum writing of magnetic tapes having a high coercive force.

A stronger writing field is achieved with the magnetic head disclosed in said EP 0,273,496. This known magnetic head has a transducing gap extending between two core limbs, which gap is composed of a plurality of layers of non-magnetic material. Each core limb has a core face opposite the gap, which face is provided with a cladding of $Ni_{80}Fe_{20}$ by means of sputtering. An insulation layer at $SiO_2$ of the transducing gap is provided on each $Ni_{80}Fe_{20}$ cladding. A layer of Mo is provided on each insulation layer and a layer of Au is provided on each Mo layer, the Au layers being bonded to each other by means of thermocompression.

It is noted in EP 0,273,496 that the $SiO_2$ insulation layer in the transducing gap functions as a barrier between the soft-magnetic material of the cladding which is formed, for example, from an alloy based on Ni-Fe or Fe-Al-Si, and the metallic materials of the transducing gap, thus preventing an electrochemical interaction between cladding and transducing gap. A drawback of the $SiO_2$ insulation layer which is present is its relatively poor adhesion to the cladding layer.

SUMMARY OF THE INVENTION

It is one of the objects of the invention to improve the magnetic head mentioned in the opening paragraph in at least a mechanical respect.

For this purpose the magnetic head according to the invention is characterized in that the cladding provided on the opposing core faces comprises a first cladding layer of an alloy based on Ni-Fe on which a second cladding layer of an amorphous alloy based on Co-Ti and/or Zr and/or Hf-Nb and/or Ta is provided, the first metallic material of the transducing gap being directly provided on the amorphous alloy of the second cladding layer.

DETAILED DESCRIPTION OF THE INVENTION

In the magnetic head thus formed the transducing gap may exclusively be composed of metallic layers. Of these metallic layers the first metallic layer primarily serves as a bonding layer between the amorphous alloy of the cladding and the second metallic layer of the transducing gap. Gold, silver and platinum are eminently suitable as materials for the second metallic layer.

Since there is a strong mechanical adhesion between the cladding and the transducing gap, it is possible to use a laser beam during manufacture of the magnetic head so as to give the transducing gap the desired gap width.

One of said possible amorphous alloys is, for example, $Co_{86.1} Zr_{2.9} Nb_{11.0}$, which material has a high saturation magnetization and permeability and a low magnetostriction.

One embodiment of the magnetic head according to the invention is characterized in that an intermediate layer optically contrasting to the cladding is present in the transducing gap between the layer of a first metallic material and one of the layers of a second metallic material. In this way the transducing gap is more visible, which is important during manufacture of the magnetic head, particularly for the purpose of assessing the quality of the transducing gap and/or the positioning and/or dimensioning of the gap by means of an optical microscope. The intermediate layer is preferably provided with an oxide and/or a nitride.

A further embodiment of the magnetic head according to the invention, in which the material of the second metallic layer of the transducing gap is chosen from the group of Au, Ag and Pt, is characterized in that the oxide of the intermediate layer is $SiO_2$, $Al_2O_3$ or $ZrO_2$.

To improve the adhesion, if an optically contrasting intermediate layer is present, an embodiment is characterized in that a further layer of a metallic material is present between the optically contrasting intermediate layer and the second metallic layer. Very good results are achieved if the metallic material of the further layer is chosen from the group of Mo, Ti, Cr and NiCr.

A still further embodiment of the magnetic head according to the invention is characterized in that the first cladding layer of an alloy based on Ni-Fe extends between a core face and the second cladding layer, the first cladding layer of an alloy based on Ni-Fe being provided on a base layer which is provided on the core face, said base layer comprising a material chosen from the group of Cr, Mo or titanium oxide. The base layer is used to improve the mechanical adhesion of the alloy based on Ni-Fe (sendust) to the ferrite of the magnetic core.

Figure 1:
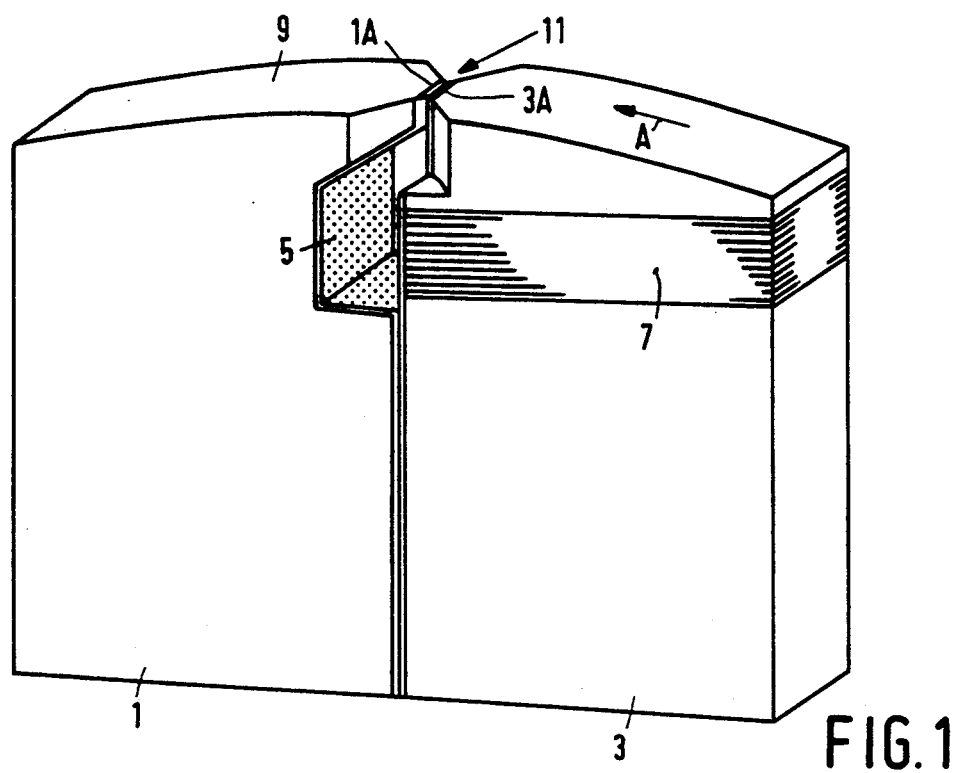
FIG. 1 is a perspective elevational view of an embodiment of a magnetic head according to the invention.
Figure 2:
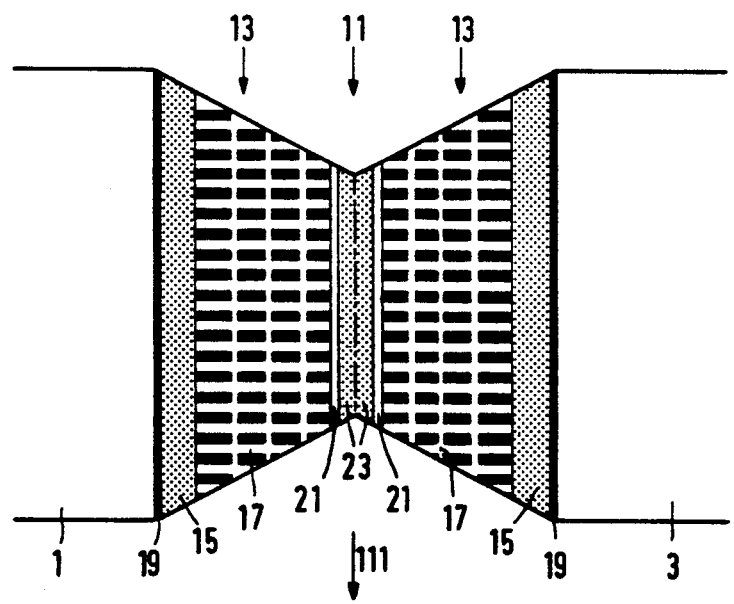
FIG. 2 is a plan view of an enlarged part of the magnetic head of FIG. 1.

Embodiments of the invention will now be described in greater detail by way of example with reference to the accompanying drawing shown in FIGS. 1 and 2, is suitable for writing and reading magnetic tapes having high coercive forces. The magnetic head has a magnetic core composed of two core limbs 1 and 3 in which a winding aperture 5 is provided. A coil 7 passing through the winding aperture 5 is wound around one of the core limbs. The core limbs 1 and 3 which are formed from a ferrite, for example, polycrystalline Mn-Zn ferrite, constitute a tape contact face 9 on which a magnetic tape (not shown) is moved in the direction of the arrow A during operation of the magnetic head. A non-magnetic transducing gap 11 extending as far as the tape contact face 9 is present between the core limbs 1 and 3. The core limbs 1 and 3 each have core faces 1A and 3A, respectively, located opposite the gap 11, on which faces a cladding 13 of a soft-magnetic material having a higher saturation magnetization than the ferrite is provided.

The cladding 13 on each core face 1A and 3A is composed of a first cladding layer 15 of an alloy based on Ni-Fe, for example, $Ni_{80}Fe_{20}$, and a second cladding layer 17 of an amorphous alloy based on Co-Ti and/or Zr and/or Hf-Nb and/or Ta, for example Co86.1 Zr2.9 Nb11.0. A base layer 19 of a material chosen from the group of Cr, Mo or titanium oxide, for example, Cr is present between the first cladding layers 15 and the core limbs 1 and 3. The base layer 19 is not strictly necessary but serves to improve the mechanical adhesion between the core limbs and the first cladding layers.

The gap 11 is composed of two layers 21 of a first metallic material chosen from the group of Mo, Ti, Cr and NiCr, and two layers 23 of a second metallic material chosen from the group of Au, Ag and Pt. In this example the first metallic material is Mo and the second metallic material is Au. The layers 21 are directly provided, i.e. without any intermediate layer, on the second cladding layers 17 of an amorphous alloy. The layer 21 serves as a diffusion barrier and as a bonding layer between the amorphous alloy and the second metallic material of the layers 23. The layers 23 are bonded to each other by means of thermocompression.

According to the invention the method of manufacturing the magnetic head shown in FIGS. 1 and 2 is characterized by successively providing on each of the core limbs 1 and 3 a first cladding layer 15 of an alloy based on Ni-Fe, a second cladding layer 17 of an amorphous alloy of a composition already described, a layer 21 of a first metallic material and a layer 23 of a second metallic material, whereafter the two layers 23 are bonded to each other at an elevated pressure and temperature, and subsequently the desired gap width is formed by means of a laser technology. If desired, a base layer 19 serving as a bonding layer may be provided on the core faces 1A and 3A before the first cladding layers 15 are provided. All layers are preferably provided by means of cathode sputtering.

Figure 3:
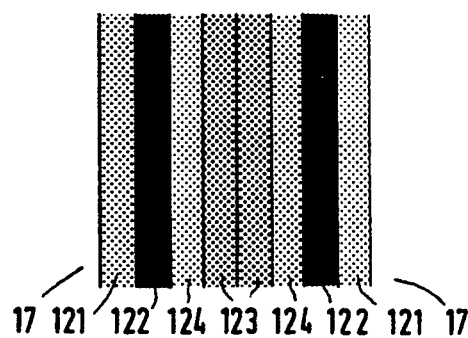
FIG. 3 is a diagrammatic representation of a transducing gap of another embodiment of a magnetic head according to the invention.

The gap 111 diagrammatically shown in FIG. 3 is present between two second cladding layers 17 of a cladding which is identical or similar to the cladding of the magnetic head shown in FIGS. 1 and 2. The transducing gap 111 is composed of two layers 121 of a first metallic material directly provided on the second cladding layers 17 on which two intermediate layers 122 of a material optically contrasting to the cladding, for example, $SiO_2$ are provided, two further layers 124 of a metallic material being provided on the intermediate layers 122, and two layers 123 of a second metallic material being provided on the further layers 124. The first metallic material of the layers 121 and the metallic material of the further layers 124 are chosen from the group of Mo, Ti, Cr and NiCr. The second metallic material of the layers 123 is chosen from the group of Au, Ag and Pt. The layers 123 are bonded to each other by means of thermocompression.

I claim:

1. A magnetic head for recording and/or reproducing magnetic information in a track of a magnetic information carrier, comprising a magnetic core having two core limbs formed from a ferrite, which core limbs constitute two opposing core faces located opposite each other, each of said opposing core faces having a cladding of a soft-magnetic material having a higher saturation magnetization than the ferrite, a tape contact face along which the information carrier is movable, a non-magnetic transducing gap present between the cladding of each opposing core face and terminating in the tape contact face, which gap has at least one layer of a first metallic material on each cladding and bonded layers of a second metallic material, the first metallic material being chosen from the group of Mo, Ti, Cr and NiCr, and an electric coil passing through a winding aperture and surrounding a part of the magnetic core, characterized in that each cladding comprises a first cladding layer of an alloy based on Ni-Fe on which a second cladding layer of an amorphous alloy based on Co-Ti and/or Zr and/or Hf-Nb and/or Ta is provided, each first metallic material of the transducing gap being directly provided on each second amorphous alloy layer of the cladding.

2. A magnetic head as claimed in claim 1, characterized in that an intermediate layer optically contrasting to the cladding is present in the transducing gap between the layer of a first metallic material and one of the layers of a second metallic material.

3. A magnetic head as claimed in claim 2, characterized in that the intermediate layer is formed from an oxide and/or a nitride.

4. A magnetic head as claimed in claims 2 or 3, in which the second metallic material of the transducing gap is chosen from the group of Au, Ag and Pt, characterized in that the intermediate layer is formed from $SiO_2$, $Al_2O_3$ or $ZrO_2$.

5. A magnetic head as claimed in claim 2 or 3, characterized in that a further layer of a metallic material is present between the optically contrasting intermediate layer and the layer of a second metallic material.

6. A magnetic head as claimed in claim 4, characterized in that the metallic material of the further layer is chosen from the group of Mo, Ti, Cr and NiCr.

7. A magnetic head as claimed in claims 1, 2 or 3, characterized in that the first cladding layer of an alloy based on Ni-Fe extends between a core face and the second cladding layer, the first cladding layer of an alloy based on Ni-Fe being provided on a base layer which is provided on the core face, said base layer comprising a material chosen from the group of Cr, Mo or titanium oxide.

* * * * *